(12) United States Patent
Centofanti et al.

(10) Patent No.: US 6,251,283 B1
(45) Date of Patent: Jun. 26, 2001

(54) METHODS FOR REMOVING SELENIUM FROM A WASTE STREAM

(75) Inventors: Louis Centofanti, Atlanta, GA (US); Randy Self; Tommy W. Yarbrough, both of Gainesville, FL (US)

(73) Assignee: Perma-Fix Environmental Services, Inc., Gainesville, FL (US)

( * ) Notice: Subject to any disclaimer, the term of this patent is extended or adjusted under 35 U.S.C. 154(b) by 0 days.

(21) Appl. No.: 09/390,604

(22) Filed: Sep. 3, 1999

(51) Int. Cl.⁷ ........................................................ C02F 1/58
(52) U.S. Cl. ........................ 210/721; 210/724; 210/726; 210/727; 210/911; 210/912; 423/509; 588/256
(58) Field of Search .................................. 210/721, 724, 210/725, 726, 727, 758, 911, 912; 423/509; 588/252, 256

(56) References Cited

U.S. PATENT DOCUMENTS

| 4,566,975 | * | 1/1986 | Allgulin | 210/711 |
|---|---|---|---|---|
| 4,915,928 | | 4/1990 | Marcantonio | 423/510 |
| 4,935,146 | | 6/1990 | O'Neill et al. | 210/684 |
| 4,971,702 | | 11/1990 | Renk | 210/684 |
| 5,071,568 | | 12/1991 | Bennett et al. | 210/754 |
| 5,089,141 | | 2/1992 | Murphy | 210/719 |
| 5,494,582 | | 2/1996 | Goodman | 210/631 |
| 5,510,040 | | 4/1996 | Miller et al. | 210/721 |
| 5,603,838 | | 2/1997 | Misra et al. | 210/665 |
| 5,853,598 | * | 12/1998 | Ogoshi et al. | 210/724 |
| 6,033,572 | * | 3/2000 | Yano et al. | 210/631 |

* cited by examiner

*Primary Examiner*—Peter A. Hruskoci
(74) *Attorney, Agent, or Firm*—Kilpatrick Stockton, LLP

(57) ABSTRACT

The present invention is directed to a method for removing selenium from a waste stream. The process is a multi-step process that removes selenium from a waste stream in the form of barium selenate and/or barium selenite. In a further step, the barium selenate and/or barium selenite forms a complex precipitate with barium sulfate, which encapsulates the barium selenate and/or barium selenite. The complex precipitate is subsequently removed from the waste stream.

15 Claims, No Drawings

METHODS FOR REMOVING SELENIUM FROM A WASTE STREAM

FIELD OF THE INVENTION

The present invention is directed to the removal of toxic metals from a waste stream, specifically, the removal of selenium from an aqueous solution, industrial process waters, and/or waste water.

BACKGROUND OF THE INVENTION

One of the major problems facing industries such as mining, precious metals, and energy industries (e.g., coal mining and coal-fired power plants) is removal of selenium from process effluent to meet federal and state compliance standards. Stringent standards for the maximum level of pollutants in water to be used for drinking or related to ground water systems are being promulgated by federal and state agencies. The current allowable maximum concentration level for selenium in waste waters set by federal standards is 1.0 milligrams per liter. Selenium removal from ground water presents a challenge in many geographical areas of the United States.

Several methods are available for reducing selenium concentrations to acceptable levels in aqueous solutions. One method employed to remove or substantially reduce the concentration of soluble inorganic pollutants such as heavy metals in water is chemical precipitation of the metals as their oxides or their hydroxides. This precipitation generally is effected by the addition of lime, alum or an iron salt to the water at an appropriate pH. Other treatment methods, such as ion exchange, reverse osmosis, electrolysis or distillation, also can be effective in removing various pollutants. However, these methods are considerably more expensive and generally narrower in application scope than is desirable for the treatment of water containing higher levels of selenium. Often it is difficult to remove selenium using conventional methods.

It is known that selenium ions can be removed from aqueous systems employing chemical precipitation if the selenium is present in the selenite ($SeO_3^{-2}$) form. Generally, such precipitation methods comprise treating the selenium-containing aqueous system with an iron salt, such as ferric or ferrous sulfate, chloride or hydroxide, or with aluminum or zinc in some appropriate form such as powder or granules. However, such chemical precipitation methods provide only very limited removal of selenium when it is present in the selenate ($SeO_4^{-2}$) form. Therefore, when selenium is present in the selenate oxidation state ($Se^{+6}$), its removal generally is effected by either ion exchange or reverse osmosis.

In particular, experimental studies have shown that chemical precipitation employing ferric sulfate can achieve a significant removal of selenium in the selenite oxidation state ($Se^{+4}$) from an aqueous stream containing low levels of selenite. More particularly, when ground water containing 0.03 milligrams per liter of selenium in the selenite oxidation state and having pH of 5.5 is treated with 30 milligrams of ferric sulfate per liter, about 85% of the selenium is removed from the water (U.S. Environmental Protection Agency, "Manual of Treatment Techniques for Meeting the Interim Primary Drinking Water Regulations," May 1977, pages 29–31).

U.S. Pat. No. 3,933,635 discloses a process for removing selenium ions present in the selenite oxidation state from acidic process waters. Acidic process water, having a pH of about 1.0 to 4.0, is reacted with a metallic reducing agent at a temperature in the range of from about 250° C. to about 85° C. for a sufficient time to reduce the soluble selenium in the selenite oxidation state to insoluble elemental selenium. Preferably, the temperature is maintained in the range of from about 50° C. to about 70° C. The reducing agent can comprise aluminum, iron or zinc in an appropriate form, such as, for example, a powder, scrap fragments, granules, wools, and the like. The preferred reducing agent for selenium in the selenite oxidation state is zinc powder.

In contrast, laboratory tests and pilot plant studies have shown that chemical precipitation, employing alum, lime, ferrous sulfate or ferric sulfate, is substantially ineffective for removing selenium in the selenate oxidation state from water. Studies on water having a selenium concentration of 0.03 to 10 milligrams per liter have shown that the conventional chemical precipitation methods remove less than 10 percent of the selenium from the water (U.S. Environmental Protection Agency, "Manual of Treatment Techniques for Meeting the Interim Primary Drinking Water Regulations," May 1977, pages 29–31).

It has been shown that selenium ions in the selenate oxidation state can be removed by ion exchange or reverse osmosis. As previously indicated, these methods are prohibitively expensive when large volumes of an aqueous solution must be treated. Further, both methods produce a contaminated regeneration effluent that requires further treatment for selenium fixation or removal before disposal. Thus, the selenium removal problem still exists but in a more highly concentrated solution.

U.S. Pat. No. 4,405,464 provides a method by which selenium, as the selenate, can be chemically precipitated from an aqueous system using metallic iron. This process is also disclosed as being capable of removing a substantial portion of any selenium in its selenite oxidation state. This process is economically more attractive than either the ion exchange or reverse osmosis methods, which have been proposed or which are currently in use. However, this method is not suitable for aqueous solutions having a pH greater than 6.0. Thus, if the water is alkaline or neutral, it is preferably acidified through the addition of a quantity of a mineral acid such as, for example, hydrochloric acid or sulfuric acid or any other acidic solution such as acidic mill process water.

U.S. Pat. No. 5,603,838 provides a method by which selenium and arsenic are chemically precipitated from an aqueous system using metallic iron. This process is also disclosed as being capable of removing a substantial portion of any selenium in its selenite and/or selenate oxidation state. This process uses an lanthanum oxide/alumina combination to form an insoluble selenium complex, which is subsequently separated from the aqueous solution to remove the selenium. Although the disclosed process removes both selenite and selenate states of selenium, the disclosed process requires relatively expensive reactants to remove selenium from a waste stream.

Literature published to date by the EPA and others reports removal efficiency of greater than 98% of selenium with ALCOA™ F-1 alumina. However, the high chemical impurity level in F-I results in a low point of zero charge, which means low specific adsorption of negatively charged ions. F-1 alumina also has an inherently low chemisorption capacity, which makes this material a poor choice as an adsorbent for selenium in any form.

What is needed in the art is a consistent, low cost, efficient method of removing selenium from a waste stream. The process should be capable of removing selenium from a solid or liquid waste stream. Further, the process should effectively remove both the selenite and selenate states of selenium without the use of expensive reactants.

SUMMARY OF THE INVENTION

The present invention is directed to a process of removing selenium from a waste stream. The process is a multi-step process that precipitates the selenium as a metal selenate or metal selenite. The precipitation is very effective due to the coprecipitation of selenium-containing salts with a soluble sulfate, which encapsulates the selenium-containing salts.

The process of the present invention may be used to remove selenium from a variety of waste streams. Further, process of the present invention may be used to reduce the amount of selenium in a variety of waste streams to levels below 0.01 milligrams per liter (mg/L) of waste stream.

These and other features and advantages of the present invention will become apparent after a review of the following detailed description of the disclosed embodiments.

DESCRIPTION OF THE PREFERRED EMBODIMENTS

The present invention is directed to a process of removing selenium from a waste stream. The process is a multi-step process that precipitates the selenium as metal selenate or metal selenite. The precipitation is very effective due to its coprecipitation with a soluble sulfate, which encapsulates the metal selenate or metal selenite.

The process of the present invention may be used on a solid waste, as well as, a liquid waste. If the waste material is a solid, the waste material is added to water to create a solution or slurry. If the waste material is a water-base liquid, the waste material may be used in the present process without modification. The process of the present invention can be carried out in a batch or continuous manner. While any metal salt and any soluble sulfate may be used in the process of the invention, the process will conveniently be illustrated in terms of the use of barium chloride and ferrous sulfate. Generally, the process comprises the following steps:

| Step I | Waste Soln + BaCl$_2$ (10% soln) → Mixture I |
| Step II | Mixture I + FeSO$_4$ → Solid I + Soln II |
| Step III | Soln II + Excess FeSO$_4$ → Solid II + Soln III |

In Step I of the process, a barium salt solution is added to the waste material, preferably with agitation, to form a first mixture (Mixture I) containing barium selenate and/or barium selenite. Any soluble metal salt may be used in Step I. Preferred metal salts are salts of barium, lead, calcium, with salts of barium being particularly preferred. Preferably, the metal salt is a chloride, bromide, acetate, or a combination of these salts. Thus, preferred salts for use in Step I of the process are barium chloride, barium bromide, barium acetate, or a combination thereof. Preferably, enough barium salt solution is added to the waste solution to produce an excess of barium in the first mixture. The waste stream and barium salt solution may remain in contact for a time sufficient to convert substantially all of the selenium present in the waste stream to barium selenate and/or barium selenite. The contact time will vary depending on the concentration of selenium present in the waste stream. Preferably, the waste stream and barium salt solution remain in contact for about 15 to 20 minutes. More preferably, the waste stream and barium salt solution remain in contact for about one hour.

In Step II of the process, a soluble sulfate is added to the first mixture to produce BaSO$_4$ and a second solution (Soln II). The BaSO$_4$ coats barium selenate and/or barium selenite present in the first mixture to form a solid precipitate (Solid I). The soluble sulfate may be selected from any sulfate, which is soluble and forms BaSO$_4$. Preferably, the sulfate is sodium sulfate, ferrous sulfate, sulfuric acid, or a combination thereof. In this step, it is desirable to add an amount of sulfate, which results in a second solution still having a small concentration of barium in solution. The preferred amount of sulfate added in this step is that amount which will leave between 1,000 mg/L and 2,000 mg/L of barium in solution after the addition. The first mixture and sulfate may remain in contact for a time sufficient to convert a desired amount of barium selenate and/or barium selenite to barium sulfate/barium selenate (or barium selenite) precipitate. The contact time will vary depending on the concentration of barium selenate and/or barium selenite present in the first mixture. Preferably, the first mixture and sulfate remain in contact for about 15 to 20 minutes. More preferably, the first mixture and sulfate remain in contact for about one hour.

The solid precipitate in the second solution may be separated from the solution by any means known to those of ordinary skill in the art including, but not limited to, filtration, centrifugation, and settling. The preferred method of separation is gravity settling followed by decantation. Once the solid is separated from the second solution, more sulfate is added to the second solution (Step III). The sulfate added in this step may be any sulfate and may be the same or different from the sulfate added in Step II. Preferably, the sulfate added in this step comprises sodium sulfate, ferrous sulfate, sulfuric acid, or a combination thereof and is the same as the sulfate added in Step II. Preferably, an excess amount of sulfate is added to the second solution, resulting in more BaSO$_4$-containing solid precipitate (Solid II) and a third solution (Soln III) containing excess sulfate ions. Step III precipitates any remaining Ba, also a hazardous material, from the second solution as a solid precipitate. As in Step II, the solid precipitate in the third solution may be separated from solution by any means known to those of ordinary skill in the art.

In Step III the second solution and excess sulfate may remain in contact for a time sufficient to convert a desired amount of barium selenate and/or barium selenite to barium sulfate/barium selenate (or barium selenite) precipitate, as well as, convert excess barium to barium sulfate. The contact time will vary depending on the concentration of barium selenate and/or barium selenite and barium present in the second solution. Preferably, the second solution and excess sulfate remain in contact for about 15 to 20 minutes. More preferably, the second solution and excess sulfate remain in contact for about one hour The above-described process of the present invention may be used to reduce the amount of selenium in a waste stream to levels below 10.0 milligrams per liter (mg/L) of waste stream. Preferably, the process of the present invention reduces the amount of selenium in a waste stream to a level of less than about 1.0 milligrams per liter (mg/L) of waste stream. More preferably, the process of the present invention reduces the amount of selenium in a waste stream to a level of less than about 0.01 milligrams per liter (mg/L) of waste stream.

In an further embodiment of the present invention, one or more oxidizers may be added to the waste material prior to Step I. Suitable oxidizers include, but are not limited to, hydrogen peroxide, sodium persulfate, chlorine, and potassium permanganate. Preferably, the oxidizer is hydrogen peroxide. The oxidizer may be added to the waste stream in any amount. Preferably, one or more oxidizers are added to the waste stream in an amount of about 3 to 5 moles of oxider per mole of selenium.

In a further embodiment of the present invention, the pH of the solutions in Steps II and III may be adjusted by, for example, adding acid or base to the solutions. Suitable pH adjusting agents include, but are not limited to, sodium hydroxide and sulfuric acid. The salts formed in steps II and III are precipitated at different pHs. For example, when the pH is adjusted to between about 8 and 9, iron, from ferrous sulfate, will precipitate as iron hydroxide. This precipitation aids in the removal of Se and Ba by coprecipitation.

The process of the present invention is effective over a wide pH range, typically between about 1 and about 11. Preferably, the process is carried out at a pH of about 4 to about 10. More preferably, the process is carried out at a pH of about 6 to about 9.

The process of the present invention may be used on any waste stream. Suitable waste streams include, but are not limited to, industrial process water streams, such as manufacturing processes; mining effluents from coal and precious metal mining operations; and waste streams from petroleum refining. Such process streams typically contain from about 10 mg/L to about 100 mg/L of selenium. Moreover, the process of the present invention is capable of removing selenium from extremely heavily loaded aqueous solutions, having up to about 1,000 mg/L of selenium. The process of the present invention removes up to about 97 percent of the selenium present in such process streams. In less heavily loaded streams, removal efficiencies of 99.99% have been attained.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Removal of Selenium from Contaminated Water 19 ml of a 10% barium chloride solution was added to 100 ml of contaminated water. 0.66 g of sodium sulfate was added to the mixture. The pH of the mixture was adjusted to 8 with a 50% solution of NaOH to form a precipitate. The precipitate was filtered and removed. Another 0.33 g of sodium sulfate was added. The mixture was again filtered to produce a clean solution. The data in Table 1 below indicate that nearly all of the selenium was removed from the contaminated water sample, demonstrating that the process of the present invention is effective in removing selenium from water sources.

| Sample | Selenium Level Before Treatment | Selenium Level After Treatment |
|---|---|---|
| 1 (as selenite) | 99.7 ppm | <0.01 ppm |
| 2 (as selenate) | 113.8 ppm | <0.01 ppm |
| 3 (mixed selenite & selenate) | 107.3 ppm | <0.01 ppm |

EXAMPLE 2

Comparison of Soluble Sulfates in the Removal of Selenium from Contaminated Water A sample of industrial waste water containing a high salt content, including 5% sodium and 2.5% magnesium, was treated by the process of the invention as described in Example 1, except that ferrous sulfate ($FeSO_4$), sodium sulfate ($Na_2SO_4$), and sulfuric acid ($H_2SO_4$) were employed as the soluble sulfate in Steps II and III of the process. The selenate levels were detected using ICAP. However, the low detection level was limited due to the high salt content of the water samples. The Method Detection Level (MDL) of the detection equipment was approximately 7–10 mg/L. As can be seen from the data below, all three of these soluble sulfates removed selenium from the contaminated water to levels below those capable of detection, i.e., below 7–10 mg/L.

| $BaCl_2$ Dose (lb/gal) | Ba:Se Mole Ratio | Dose (lb/gal) | Initial Se (mg/L) | Final Se (mg/L) | Final Ba (mg/L) |
|---|---|---|---|---|---|
| | | $Fe_2SO_4$ | | | |
| $1.25 \times 10^{-1}$ | 59.7 | $8.3 \times 10^{-3}$ | 81 | <MDL | N/A |
| $1.25 \times 10^{-1}$ | 59.7 | $8.3 \times 10^{-3}$ | 81 | <MDL | N/A |
| $1.25 \times 10^{-1}$ | 59.7 | $8.3 \times 10^{-3}$ | 81 | <MDL | N/A |
| $1.25 \times 10^{-1}$ | 59.7 | $8.3 \times 10^{-3}$ | 81 | <MDL | 3.3 |
| $1.25 \times 10^{-1}$ | 59.7 | $8.3 \times 10^{-3}$ | 81 | <MDL | 8.1 |
| $1.25 \times 10^{-1}$ | 59.7 | $8.3 \times 10^{-3}$ | 81 | <MDL | 27.2 |
| | | $Na_2SO_4$ | | | |
| $1.25 \times 10^{-1}$ | 59.7 | $6.5 \times 10^{-3}$ | 81 | <MDL | 3 |
| | | $H_2SO_4$ | | | |
| $1.25 \times 10^{-1}$ | 59.7 | $4.25 \times 10^{-3}$ | 81 | <MDL | 2.9 |

The above disclosed examples are preferred embodiments and are not intended to limit the scope of the present invention in any way. Various modifications and other embodiments and uses of the disclosed salts, apparent to those of ordinary skill in the art, are also considered to be within the scope of the present invention.

We claim:

1. A method of removing selenium in the form of selenite or selenate from a waste stream, said method comprising:

contacting the waste stream with a metal salt solution to form a first mixture; and contacting the first mixture with a first sulfate solution to form a first solid precipitate and a second solution; wherein the first sulfate forms a metal sulfate with the metal salt of the first mixture; and wherein the metal sulfate encapsulates the selenium to form the first solid precipitate; and contacting the second solution with a second sulfate solution to form a second solid precipitate and a third solution; and removing the first solid precipitate from the second solution prior to contacting the second solution with the second sulfate solution; and removing the second solid precipitate from the third solution;

wherein the metal salt is selected from the group consisting of a barium salt, a lead salt, and a calcium salt, and the metal salt is a bromide, chloride, or acetate; and wherein the first sulfate solution and the second sulfate solution independently comprise sodium sulfate, ferrous sulfate, sulfuric acid, or a combination thereof.

2. The method of claim 1, wherein the first mixture contains excess metal in solution.

3. The method of claim 1, wherein the metal salt solution and the waste stream contact one another for about 15 minutes to about 1 hour.

4. The method of claim 1, wherein the metal salt is a salt of barium.

5. The method of claim 1, wherein the second solution contains excess barium in solution.

6. The method of claim 1, wherein the first mixture and the first sulfate solution contact one another for about 15 minutes to about 1 hour.

7. The method of claim 1, wherein the third solution contains excess sulfate in solution.

8. The method of claim 1, wherein the second solution and the second sulfate solution contact one another for about 15 minutes to about 1 hour.

9. The method of claim 1, wherein selenium in the form of selenite is removed from the waste stream.

10. The method of claim 1, wherein selenium in the form of selenate is removed from the waste stream.

11. The method of claim 1, wherein the third solution contains less than 0.01 mg/L of selenium in solution.

12. The method of claim 1, wherein the third solution contains less than 0.8 mg/L of selenium in solution.

13. The method of claim 1, wherein the first sulfate solution and the second sulfate solution comprise ferrous sulfate.

14. The method of claim 1, wherein one or more oxidizers are added to the waste stream prior to contacting the waste stream with the metal salt solution.

15. The method of claim 1, wherein the metal salt is barium chloride, barium bromide, barium acetate or a combination thereof.

* * * * *